(12) United States Patent
Hanaoka

(10) Patent No.: US 7,309,070 B2
(45) Date of Patent: Dec. 18, 2007

(54) OPERATION ARM AND HAND CART COMPRISING OPERATION ARM

(75) Inventor: Toru Hanaoka, Tokyo (JP)

(73) Assignee: Hanaoka Sharyo Co., Ltd., Tokyo (JP)

( * ) Notice: Subject to any disclaimer, the term of this patent is extended or adjusted under 35 U.S.C. 154(b) by 0 days.

(21) Appl. No.: 11/029,657

(22) Filed: Jan. 6, 2005

(65) Prior Publication Data
US 2005/0206105 A1    Sep. 22, 2005

(30) Foreign Application Priority Data
Mar. 17, 2004    (JP) .............................. 2004-076091

(51) Int. Cl.
*B62B 3/00* (2006.01)

(52) U.S. Cl. ..................... 280/47.34; D34/27; 16/430; 16/DIG. 5

(58) Field of Classification Search ............ 280/79.11, 280/47.371, 47.34, 655, 655.1; D34/27; 16/430, 421, DIG. 5
See application file for complete search history.

(56) References Cited

U.S. PATENT DOCUMENTS

| | | | | |
|---|---|---|---|---|
| 3,357,716 A | * | 12/1967 | Musichuk | .............. 280/47.371 |
| 5,261,215 A | * | 11/1993 | Hartz et al. | .................. 56/11.9 |
| 5,299,816 A | * | 4/1994 | Vom Braucke et al. | . 280/33.998 |
| D363,590 S | * | 10/1995 | Kazmerchek et al. | ........ D34/21 |
| 5,788,252 A | * | 8/1998 | Happ et al. | .............. 280/47.34 |
| 6,024,376 A | * | 2/2000 | Golichowski et al. | ... 280/655.1 |
| 6,065,189 A | * | 5/2000 | Trine | ........................... 16/436 |
| D446,622 S | * | 8/2001 | Gaffney et al. | .............. D34/27 |
| 6,742,790 B2 | * | 6/2004 | Seagraves et al. | ....... 280/47.34 |

* cited by examiner

*Primary Examiner*—Christopher P. Ellis
*Assistant Examiner*—John D Walters
(74) *Attorney, Agent, or Firm*—Westerman, Hattori, Daniels & Adrian, LLP.

(57) ABSTRACT

An operation arm built on one side or a plurality of sides of a hand cart provided with a wheel, includes an operation section touched by an operator, and a support extending from the operation section to the hand cart, and supporting the operation section against the hand cart, and also includes a rear inclined portion inclined from an upper end of the support toward the rear side at a predetermined angle, and a grip continuous with the rear inclined portion, extending in directions crossing the forward direction and the backward direction, an extension of the grip inclined to the front side with respect to the support and formed into a circular arc shape. By so constituting, a manual pushing force is efficiently transmitted to the hand cart and an operator can operate the operation arm in a comfortable posture.

11 Claims, 3 Drawing Sheets

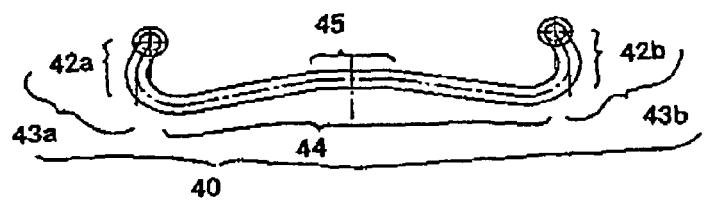
FIG. 2A
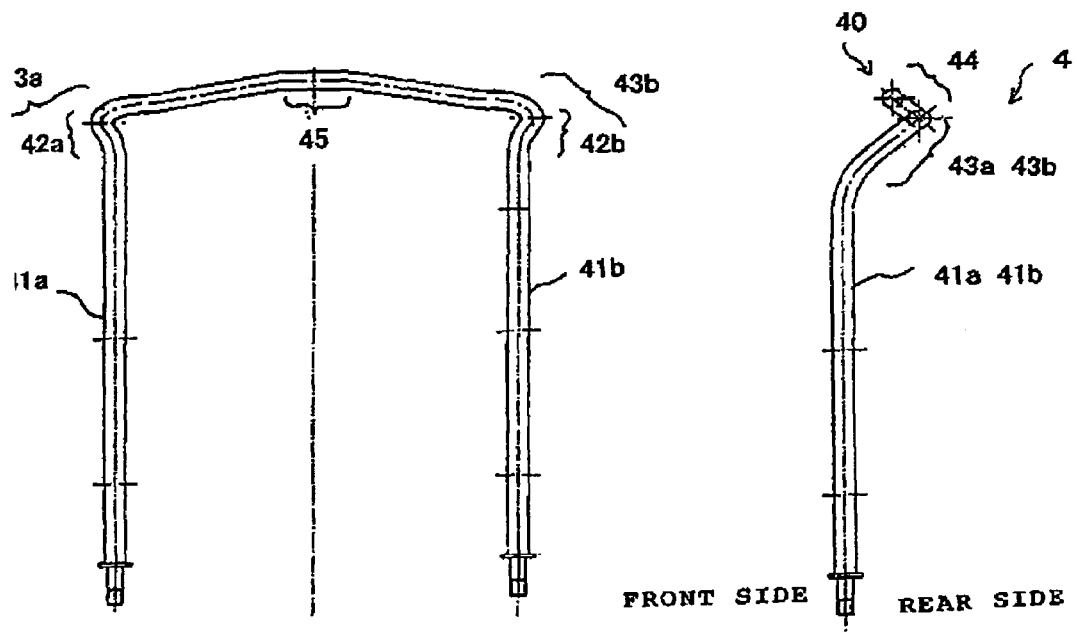
FIG. 2B
FIG. 2C

OPERATION ARM AND HAND CART COMPRISING OPERATION ARM

BACKGROUND OF THE INVENTION

1. Field of the Invention

The present invention relates to a hand cart such as a load carrying hand truck. More specifically, the present invention is intended to manually move a cart main body smoothly and easily by pushing an operation arm.

2. Description of the Related Art

Conventionally, a hand cart of this type, e.g., a load carrying hand truck, is designed to manually move a loaded wheeled cart main body by an operation for applying a manual pushing force to an operation arm built on a rear end of this cart main body.

An ordinary configuration of the conventional hand cart will be described with reference to FIG. 4. In FIG. 4, reference symbol a denotes a cart for loading goods. A pair of wheels b rotating in a certain direction through axles are provided in rear of a bottom of the cart a, and a pair of movable casters c are provided in front of the cart a, thereby facilitating a transport operation.

In addition, reference symbol d denotes an inverted-U-shaped operation arm. Both lower ends of the arm d are rotatably attached to one longitudinal end of the cart a through respective fittings e, whereby the operation arm d is made foldable toward an upper surface of the cart a. Reference symbol f denotes a back plate provided in an intermediate portion of the operation arm d.

The operation arm d is made of a metal pipe, and an operation section g corresponding to a top of an inverted U shape is formed horizontally and linearly with respect to a cart surface (or moving surface).

An operator operates the hand cart while gripping the operation section g, thereby manually moving the hand cart to feed forward, feed backward, or rotate.

SUMMARY OF THE INVENTION

Meanwhile, when the hand cart is loaded with goods and heavy, the operator grips both ends of the operation section g by hands and pushes the hand cart in a low posture so as to be closer to a height of a center of gravity of the goods. When the hand cart is unloaded and empty, the operator grips a central portion of the operation section g by one hand and pushes the hand cart a in a high posture (natural and comfortable posture). When the hand cart is empty, the operator often moves the hand cart a backward with the operation arm d side set as a front side.

Further, gripped portions of the operation section g when the operator pushes the hand cart for a long time are often changed from those when the operator pushes the hand cart for a short time.

In this way, during an operation of the hand cart, the operator changes the gripped portions of the operation section g so that a manual pushing force can be easily transmitted to the hand cart or the operate can easily assume a natural and comfortable posture, depending on operation conditions.

The conventional hand cart has, however, the following disadvantages. Since the operation section g of the operation arm d is only formed horizontally and linearly with respect to the cart surface (or moving surface), the manual pushing force cannot be efficiently transmitted to the hand cart and the operator cannot operate the hand cart in a comfortable posture.

The present invention has been achieved to solve the conventional disadvantages. It is, therefore, an object of the present invention to provide an operation arm capable of efficiently transmitting a manual pushing force to a hand cart and operating in a comfortable posture, and the hand cart including the operation arm.

The present invention relates to the hand cart configured to solve the said disadvantages.

Namely, according to the present invention, there is provided an operation arm built on one side or a plurality of sides of a hand cart provided with a wheel, the operation arm comprising:

an operation section touched by an operator; and a support extending from the operation section to the hand cart, and supporting the operation section against the hand cart, wherein if it is assumed that a side of the hand cart in a forward direction is a front side and a side of the hand cart in a backward direction side is a rear side, the operation section comprises:

a rear inclined portion inclined from an upper end of the support toward the rear side with respect to the support at a predetermined angle; and a grip continuous with the rear inclined portion, extending in directions crossing the forward direction and the backward direction, an extension of the grip inclined to the front side with respect to the support and formed into a circular arc shape.

In addition, according to the present invention, there is provided an operation arm built on one side or a plurality of sides of a hand cart provided with a wheel, the operation arm comprising:

an operation section touched by an operator; and a support extending from the operation section to the hand cart, and supporting the operation section against the hand cart, wherein if it is assumed that a side of the hand cart in a forward direction is a front side and a side of the hand cart in a backward direction side is a rear side, the operation section comprises:

a rear inclined portion inclined from an upper end of the support toward the rear side with respect to the support at a predetermined angle; and a grip continuous with the rear inclined portion, extending in directions crossing the forward direction and the backward direction, an extension of the grip inclined to the front side with respect to the support, and the extension of the grip has a shape of a polygonal line laterally symmetric with respect to the forward direction and approximate to a circular arc.

According to these configurations, by providing the grip formed into the circular arc shape or the laterally symmetric inclined shape on the operation arm, it is possible to prevent operator's arms from widening outward while pushing the cart. Namely, when the operator pushes the cart by the both hands, the operator's arms widen laterally outward by elbow joints. By providing the grip formed into the circular arc shape or the laterally symmetric inclined shape, operator's elbows are immobilized to prevent the operator's arm from widening outward (the operator's elbows are spontaneously fixed by operator's assuming an posture of pushing the cart while gripping the grip), thereby facilitating a behavior of pushing the cart in the forward direction without dispersing the manual pushing force laterally. The extension of this grip may be constituted to be inclined toward the front side in an upward or downward according to goods loaded on the cart.

Further, by providing the grip formed into the circular arc shape or the laterally symmetric inclined shape on the operation arm, the operator can grip the operation arm for a long time without straining operator's wrists and arms. Namely, a human skeletal structure is formed so that a movable range of a human hand can easily draw an arc around each side of the shoulder. If the operation section is formed linearly as seen in the conventional operation arm, the movement of the hand is out of this arc movement when the operator grips the operation section. Due to this, the operator is forced to assume an unnatural posture with both wrists directed inward along a line of the operation section when gripping the operation section. By providing the grip formed into the circular arc shape or the laterally symmetric inclined shape to be close to the shape of the arc drawn by each of the human hand, the operator can keep assuming a natural posture when gripping the operation section.

Furthermore, by constituting the operation section to be composed by a combination of the grip and the rear inclined portion, a waist part (belly part) of the operator entirely enters the grip side. It is thereby possible for the operator to closely attach the belly part to the grip and to push the cart using the entire body without pushing the cart only by the hands. When the operator starts moving the hand cart, the operator can push the hand cart in a natural posture by gripping the grip.

The hand cart according to the present invention is characterized in that the grip includes a central horizontal portion formed horizontally on a central top of the extension by a predetermined length.

According to this configuration, by providing the central horizontal portion at a high position of the operation section, if the operator operates the empty hand cart by one hand, the operator can operate the cart to move forward and backward with a low force in a high (comfortable) posture. That is, the operator bends forward because of shift of the operator's weight to the hand cart while the goods are loaded on the cart. When the hand cart is empty, by contrast, the operator does not need to bend forward and can keep assuming a higher (comfortable) posture since the operator can operate the hand cart with a lower force.

The hand cart according to the present invention is characterized in that the rear inclined portions include a bent portion that is formed in a portion continuous with the supports, and that bends outward of the cart so as to be larger than a length between two the supports or a width of the grip. The bent portion can be formed into the circular arc shape. The bent portion may be formed so as to widen up to the width of the hand cart to make the operation arm foldable. If more importance is put on operativity, the bent portion may be formed to be larger than the width of the hand cart.

In the latter case, if the support of the operation arm is built from inward of the width of the hand cart, the bent portion is widened up to the width of the hand cart or the width of the grip, whereby the operativity can be improved when the hand cart is heavily loaded and rotated.

The above-stated configurations can be combined as much as possible.

As stated so far, the present invention can provide the operation arm that can efficiently transmit a manual pushing force to a hand cart and that enable the operator to operate the operation arm in a comfortable posture, and the hand cart that includes the operation arm.

BRIEF DESCRIPTION OF THE DRAWINGS

FIGS. 1A to 1C are external views of a hand cart according to one embodiment of the present invention, wherein FIG. 1A is a plan view, FIG. 1B is a front view, and FIG. 1C is a side view of the hand cart;

FIGS. 2A to 2C are external views of an operation arm according to one embodiment of the present invention, wherein FIG. 2A is a plan view, FIG. 2B is a front view, and FIG. 2C is a side view of the operation arm;

DESCRIPTION OF THE PREFERRED EMBODIMENTS

An operation arm and a hand cart according to the present invention will be described hereinafter in detail, while referring to embodiments thereof.

Figure 1A:
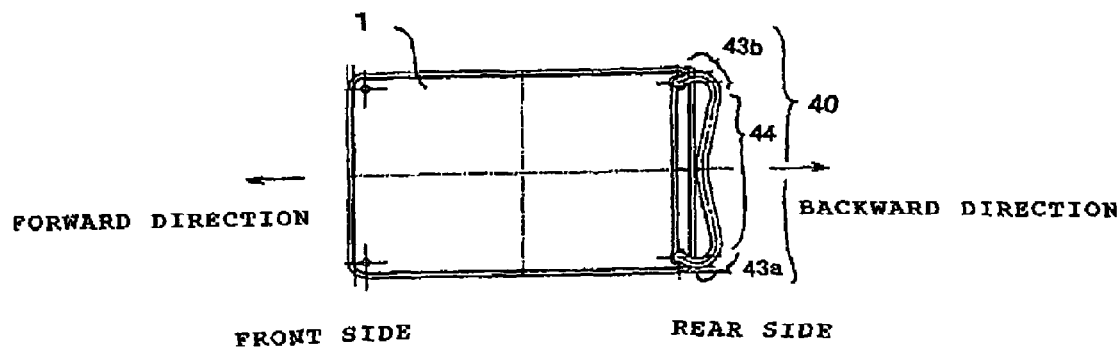
Figures 1B, 1C:
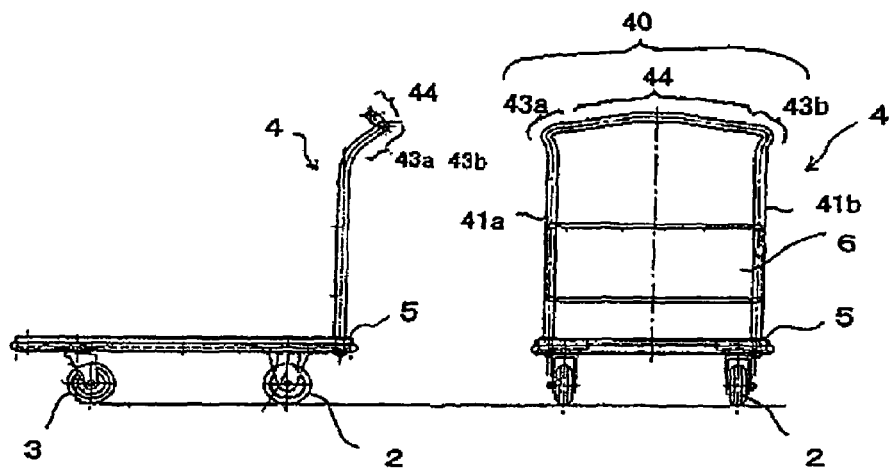

Referring to FIGS. 1A to 1C, reference numeral 1 denotes a cart (see FIG. 1A). A pair of wheels 2 are provided in rear of a bottom of the cart 1 and a pair of movable casters 3 are provided in front of the bottom of the cart 1, thereby making it possible to rotatably operate the cart 1 in an arbitrary direction (see FIG. 1B).

Reference numeral 4 denotes an operation arm formed by bending a pipe or the like into an inverted-U shape (see FIG. 1C), with both lower ends fixed to one longitudinal end of the cart 1 through respective fittings 5. Reference numeral 6 denotes a back plate provided in an intermediate portion of the operation arm 4.

The shape of the operation arm 4 will be described in detail.

As shown in FIGS. 1A to 1C, the operation arm 4 is made of, for example, a metal pipe, and composed by an operation section 40 corresponding to a top of the inverted U shape, and supports 41a and 41b that extend from both ends of the operation section 40 to the fittings 5, respectively and that support the operation section 40 against the cart 1. A material of the operation arm 4 is not limited to metal and a fiber reinforced plastic-(FRP) may be used as the material.

As shown in FIG. 2C, the operation section 40 is composed by rear inclined portions 43a and 43b and a grip 44.

It is assumed herein that one side of the cart 1 on which the operation arm 4 is built is a rear side (in a backward direction) and that the other side of the cart 1 opposite to the one side is a front side (in a forward direction). If so, the rear inclined portions 43a and 43b are formed to be inclined rearward from upper ends of the supports 41a and 41b toward an interior of the cart 1 at a predetermined angle, respectively (see FIG. 2B which is a front view of the operation arm 4 and FIG. 2C which is a side view thereof).

The grip 44 is formed to be continuous with the two rear inclined portions 43a and 43b and to extend in directions crossing forward and backward directions. Extensions of the grip 44 are formed to be inclined forward with respect to the supports 41a and 41b in a circular arc fashion (see FIG. 2B which is a front view of the operation arm 4 and FIG. 2C which is a side view thereof)

Further, the grip 44 includes a central horizontal portion 45 formed horizontally on a central top of the circular arc shape by a predetermined length (see FIGS. 2A and 2B).

The rear inclined portions 43a and 43b include bent portions 42a and 42b that are provided in portions connected to the respective supports 41a and 41b, and that bend outward of the cart 1 so that a length between the bent portions 42a and 42b is larger than a length between the supports 41a and 41b (see FIG. 2A which is a plan view of the operation arm 4 and FIG. 2B which is a front view thereof). The bent portions 42a and 42b are formed in a circular arc fashion. The bent portions 42a and 42b are formed so that the length between the bent portions 42*a* and 42*b* is at most a width of the hand cart so as to make the operation arm 4 foldable toward the hand cart. However, if more importance is put on operativity, the bent portions 42*a* and 42*b* may be formed so that the length therebetween is larger than the width of the cart.

Functions and advantages of the hand cart according to this embodiment will be described.

According to this embodiment, it is possible to prevent operator's arms from widening outward while pushing the cart by providing the grip 44. Namely, when the operator pushes the hand cart by the both hands, the operator's arms widen laterally outward by elbow joints. By providing the grip 44, operator's elbows are immobilized to prevent the operator's arm from widening outward (the operator's elbows are spontaneously fixed by operator's assuming an posture of pushing the cart while gripping the grip 44), thereby facilitating a behavior of pushing the cart in the forward direction without dispersing the manual pushing force laterally. This grip 44 is constituted to be directed in a vertical direction or anteroposterior direction according to the goods loaded on the cart.

Further, by providing the grip 44 on the operation section 4, the operator can grip the operation section 4 for a long time without straining operator's wrists and arms. Namely, a human skeletal structure is formed so that a movable range of a human hand can easily draw an arc around each side of the shoulder. If the operation section 4 is formed linearly as seen in the conventional operation arm, the movement of the hand is out of this arc movement when the operator grips the operation section 4. Due to this, the operator is forced to assume an unnatural posture with both wrists directed inward along a line of the operation section 4 when gripping the operation section 4. By providing the grip 44 into the shape close to the arc drawn by each of the human hand, the operator can keep assuming a natural posture when gripping the operation section 4.

Furthermore, by constituting the operation section 4 to be composed by a combination of the grip 44 and the rear inclined portions 43*a* and 43*b*, a waist part (belly part) of the operator entirely enters the grip side. It is thereby possible for the operator to closely attach the belly part to the grip 44 and to push the cart using the entire body without pushing the cart only by the hands. When the operator starts moving the hand cart, the operator can push the hand cart in a natural posture by gripping the grip.

According to this embodiment, the operation section 4 includes the central horizontal portion 45 at a high position. By doing so, if the operator operates the empty hand cart by one hand, the operator can operate the cart to move forward and backward with a low force in a high (comfortable) posture. That is, the operator bends forward because of shift of the operator's weight to the cart 1 while the goods are loaded on the cart 1. When the hand cart is empty, by contrast, the operator does not need to bend forward and can keep assuming a higher (comfortable) posture since the operator can operate the cart with a lower force.

Furthermore, according to this embodiment, the rear inclined portions 43*a* and 43*b* include the bent portions 42*a* and 42*b* that are connected to the respective supports 41*a* and 41*b* and that bend outward in an outside direction of the cart 1 so that the length between the bent portions 42*a* and 42*b* is larger than the length between the supports 41*a* and 41*b*. The bent portions 42*a* and 42*b* are formed in the circular arc fashion. The bent portions 42*a* and 42*b* may be formed so that the length between the bulging portions 42*a* and 42*b* is at most the width of the hand cart to make the operation arm 4 foldable. However, if more importance is put on operativity, the bent portions 42*a* and 42*b* may be formed so that the length therebetween is larger than the width of the cart 1.

In the latter case, if the supports of the operation arm 4 are built from inward of the width of the hand cart, the length between the bent portions 42*a* and 42*b* is increased up to the width of the hand cart, whereby the operativity can be improved when the cart 1 is heavily loaded and rotated.

(Another Embodiment)

Figure 3:
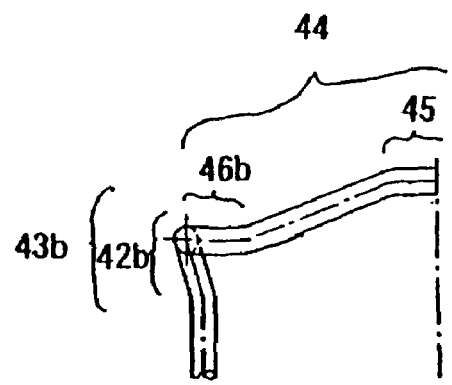
FIG. 3 is a perspective view of an operation arm according to another embodiment of the present invention, viewed from a forward direction.
Figure 4:
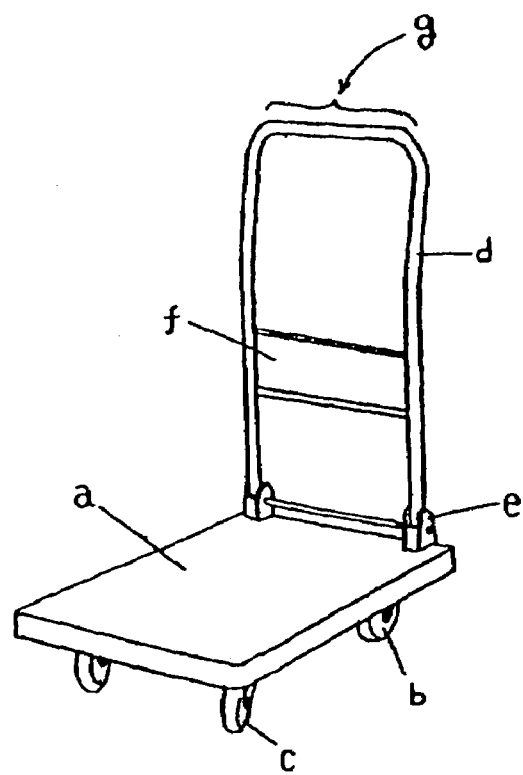
FIG. 4 is an external view of a conventional hand cart.

An operation arm and a hand cart according to another embodiment of the present invention will be described. As shown in FIG. 3, the grip 44 may be constituted to include horizontal end portions 46*a* and 46*b* adjacent to the respective rear inclined portions 43*a* and 43*b* and formed to be horizontal by a predetermined length. With this configuration, the grip 44 includes the circular arc portions and the horizontal end portions 46*a* and 46*b*. Due to this, the operator can operate the cart 1 by changing gripped portions as the operator desires. For example, when the operator starts moving the heavily loaded cart 1, the operator pushes the cart 1 in a low posture (with a stoop) while gripping the horizontal end portions 46*a* and 46*b* similarly to the conventional instance of pushing the cart 1 for a short time. When the operator operates the cart 1 for a long time, the operator pushes the cart 1 in a comfortable posture while changing the gripped portions to the circular arc potions.

In the embodiment shown in FIGS. 1A to 1C, the grip 44 extend in directions crossing the forward and backward directions, and the extensions are inclined forward with respect to the supports 41*a* and 41*b* in the circular arc fashion. However, the extensions of the grip 44 are not limited to the circular arc-shaped extensions. Namely, the extensions of the grip 44 according to the present invention may be each formed into a shape of a polygonal line laterally symmetric and approximate to the circular arc.

Further, in the embodiment shown in FIGS. 1A to 1C, the hand cart is constituted so that the operation arm 4 is fixedly built on the cart 1. Alternatively, the both lower ends of the operation arm 4 may be rotatably attached to one longitudinal end of the cart 1 through fittings so that the operation arm 4 is made foldable toward an upper surface side of the cart 1.

In the embodiment shown in FIGS. 1A to 1C, the hand cart is constituted so that the wheels 2 and the movable casters 3 are attached to the bottom of the cart 1. However, it suffices that wheels are provided on the cart 1 and wheels (e.g., two wheels, three wheels, five wheels, or six wheels) may be provided on sides or the like of the cart.

In the embodiment shown in FIGS. 1A to 1C, the operation arm is formed to be bent into the inverted-U shape. However, the shape of the operation arm is not limited to the inverted-U shape. It suffices that the operation arm is built on the cart 1, the operation section is provided in the upper portion of the operation arm, and that the supports are provided to extend from this operation section to the cart and to support the operation section. The operation arm may be generally V-shaped or three supports may be formed.

Moreover, in the embodiment shown in FIGS. 1A to 1C, the hand cart operated only manually has been described. Alternatively, the hand cart may include a motor means or an unmanned transport means for assisting in the transport operation for pushing the cart by the operator's hands.

Furthermore, the present invention is applied to a lift having the operation arm built on a wheeled cart (a cart including a lifting means), a low lift, a cart including a leveler means, an airport luggage cart for an air passenger, a shopping cart, and a baby carriage.

The invention claim is:

1. An operation arm built on one side or a plurality of sides of a hand cart provided with a wheel, the operation arm comprising:
    an operation section touched by an operator; and
    a support extending from the operation section to the hand cart, and supporting the operation section against the hand cart,
    wherein if it is assumed that a side of the hand cart in a forward direction is a front side and a side of the hand cart in a backward direction side is a rear side, the operation section comprises:
    a rear inclined portion inclined from an upper end of the support toward the rear side with respect to the support at a predetermined angle; and
    a grip continuous with the rear inclined portion, extending in directions crossing the forward direction and the backward direction, an extension of the grip inclined to the front side with respect to the support and formed into a circular arc shape; wherein the extension forming the circular arc shape is crossing the rear side of the hand cart.

2. An operation arm built on one side or a plurality of sides of a hand cart provided with a wheel, the operation arm comprising:
    an operation section touched by an operator; and
    a support extending from the operation section to the hand cart, and supporting the operation section against the hand cart, wherein
    if it is assumed that a side of the hand cart in a forward direction is a front side and a side of the hand cart in a backward direction side is a rear side, the operation section comprises:
    a rear inclined portion inclined from an upper end of the support toward the rear side with respect to the support at a predetermined angle; and
    a grip continuous with the rear inclined portion, extending in directions crossing the forward direction and the backward direction, an extension of the grip inclined to the front side with respect to the support, and
    the extension of the grip has a shape of a polygonal line laterally symmetric with respect to the forward direction and approximate to a circular arc; wherein the extension forming the circular arc shape is crossing the rear side of the hand cart.

3. An operation arm according to claim 1, wherein the extension of the grip is inclined toward the front side in one of an upward direction and a downward direction.

4. An operation arm according to claim 1, wherein the grip includes a central horizontal portion formed horizontally on a central top of the extension by a predetermined length.

5. An operation arm according to claim 1, wherein the rear inclined portions include a bent portion that is formed in a portion continuous with the supports, and that bends outward of the cart so as to be larger than a length between the two supports or a width of the grip.

6. A hand cart comprising the operation arm according to claim 1.

7. An operation arm according to claim 2, wherein the extension of the grip is inclined toward the front side in one of an upward direction or a downward direction.

8. An operation arm according to claim 2, wherein the grip includes a central horizontal portion formed horizontally on a central top of the extension by a predetermined length.

9. An operation arm according to claim 2, wherein the rear inclined portions include a bent portion that is formed in a portion continuous with the supports, and that bends outward of the cart so as to be larger than a length between the two supports or a width of the grip.

10. A hand cart comprising the operation arm according to claim 2.

11. An operation arm built on one side or a plurality of sides of a hand cart provided with a wheel, the operation arm comprising:
    an operation section touched by an operator; and
    a support extending from the operation section to the hand cart, and supporting the operation section against the hand cart,
    wherein a side of the hand cart in a forward direction is a front side and a side of the hand cart in a backward direction side is a rear side,
    the operation section comprises:
    a rear inclined portion inclined from an upper end of the support toward the rear side with respect to the support at a predetermined angle; wherein the rear inclined portions include a bent portion that is formed in a circular arc fashion and is formed in a portion continuous with the supports, and that bends outward of the cart so as to be larger than a length between the two supports or a width of the grip; and
    a grip continuous with the rear inclined portion, extending in directions crossing the forward direction and the backward direction, an extension of the grip inclined to the front side with respect to the support and formed into a circular arc shape; wherein the extension forming the circular arc shape is crossing the rear side of the hand cart.

* * * * *